(No Model.)
J. A. CHERRY.
CORN PLANTER.
No. 334,746. Patented Jan. 26, 1886.
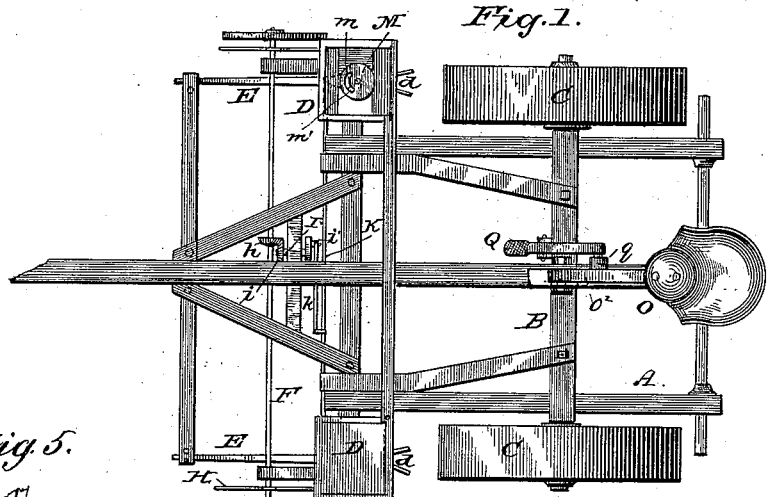
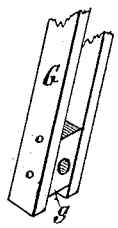
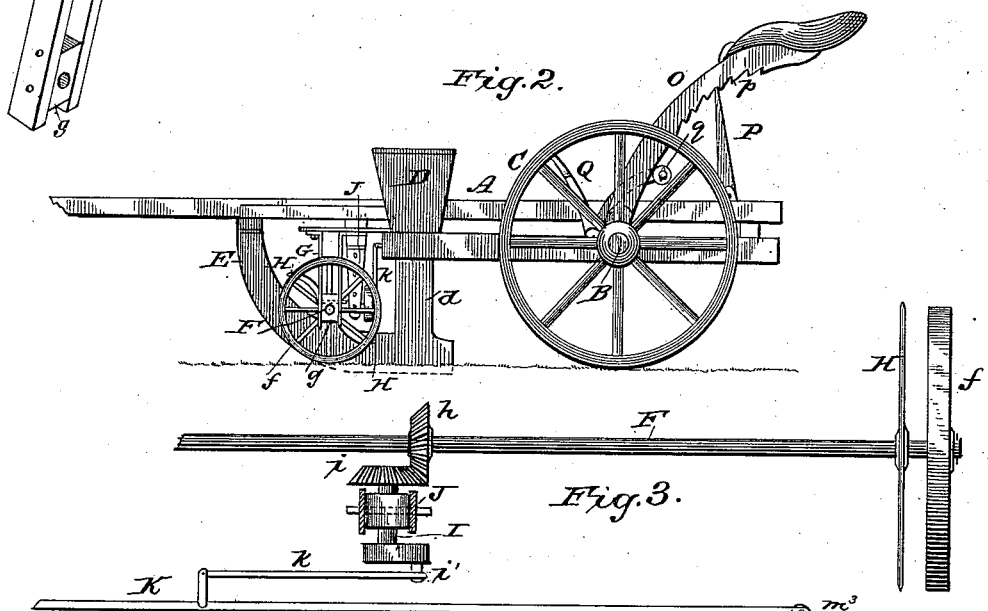
WITNESSES:
Fred G. Dieterich
John C. Kenion
INVENTOR:
J. A. Cherry
BY Munn & Co.
ATTORNEYS.
N. PETERS, Photo-Lithographer, Washington, D. C.

UNITED STATES PATENT OFFICE.

JOHN A. CHERRY, OF ROADS, MISSOURI.

CORN-PLANTER.

SPECIFICATION forming part of Letters Patent No. 334,746, dated January 26, 1886.

Application filed May 26, 1885. Serial No. 166,796. (No model.)

*To all whom it may concern:*

Be it known that I, JOHN A. CHERRY, a citizen of the United States, residing at Roads, in the county of Carroll and State of Missouri, have invented certain new and useful Improvements in Corn-Planters; and I do hereby declare that the following is a full, clear, and exact description thereof, reference being had to the accompanying drawings, making a part of this specification, in which—

Figure 1 is a plan view of the corn-planter looking from above. Fig. 2 is a side view of the same. Fig. 3 is a detail plan view of the dropping-plates and the mechanism for working them. Fig. 4 is a side view of the driver's seat attached to the tongue of the planter; and Fig. 5 is a detail view enlarged, all of which will be described.

This invention relates to corn-planters; and it consists in the detailed construction of the parts hereinafter described, by which the corn is checked by knife-blades mounted on a revolving axle, which mark the ground at every hill of corn deposited, and by which the weight of the driver is utilized and adjusted so as to effect a certain desired amount of pressure upon the runners and the wheels for working the marking-knives.

In the accompanying drawings, similar letters of reference indicate corresponding parts in all the figures.

A is the framing of the planter, mounted upon the axle B, provided with wheels C.

D are the hoppers, which contain the corn to be planted.

E are runners situated beneath the hoppers, and provided with spouts $d$, through which the corn passes from the hoppers to the ground.

F is a shaft, provided with wheels $f$, which run on the ground at the front part of the machine.

G are boxes having blocks $g$, in which the said shaft F is journaled. These blocks can be adjusted so that the wheels $f$ may always bear upon the ground.

H are knife-blades mounted upon shaft F and turning with it. These blades mark the ground at every hill of corn deposited.

$h$ is a bevel-pinion, also secured upon shaft F.

I is a shaft at right angles with the shaft F, and provided with a bevel-pinion, $i$, which gears into the bevel-pinion $h$ on the said shaft, which is also provided with a crank, $i'$, for working the dropping-bar. The shaft I is carried by the block $j$, made vertically adjustable in the box J, so as to correspond with the vertical adjustment given to the shaft F.

K is the dropping-bar, connected with the crank $i'$ by the pitman $k$.

L is the upper dropping-plate, provided with the opening $l$.

M is the dropping-plate, provided with the slot $m$, in which is placed the sliding piece $m'$, provided with a screw, $m^2$, so that the size of the slot can be varied to drop any amount of corn desired. $m^3$ is the handle which connects the plate to the dropping-bar K, from which it derives its motion.

N is the lower dropping-plate, provided with openings $n$, through which the corn passes into the spout $d$.

O is the driver's seat. $o^2$ is a lever, which supports it. The tongue of the planter is provided with a slot, $o'$, through which the curved bar $o^2$ passes. A lever, P, is connected to the tongue, which engages with any of a series of notches, $p$, on the curved bar $o^2$, so that the weight of the driver can be regulated upon the front wheels, as required.

Q is a treadle pivoted to the axle, and provided with a lever carrying the roller $q$, which raises the seat when the treadle is depressed, thus relieving the front wheels from the weight of the driver and allowing the whole of the front portion of the planter to lift up. This treadle may be passed up through the slot in the tongue, as shown in Fig. 4, or be arranged at one side of the tongue, as shown in Fig. 1. This is necessary for turning round and setting the marking-knives with the last mark made on crossing the field.

The driver may use any convenient form of hook for moving the marking-knives into their proper place at the right time with which he can reach them from his seat.

Having thus described my invention, what I claim as new, and desire to secure by Letters Patent, is—

1. The combination of the shaft F, provided with wheel $f$, and the gear $h$, the shaft I, having gear $i$, meshed with gear $h$, and provided with a crank, $i'$, the seed-dropping devices, and a connection between such devices and the crank $i'$, substantially as and for the purpose set forth.

2. In a corn-planter, the combination of the shaft F, provided with wheels $f$, the block $g$, made adjustable in boxes G, the revolving knife-blades H, the bevel-wheels $h$ and $i$, the shaft I, having crank $i'$, block $j$, adjustable in box J, and the dropping-plates worked by the said crank, substantially as described and shown.

3. In a corn-planter, the combination of the seat O, the lever $o^2$, having notches $p$ therein, the lever P, and the tongue provided with the slot $o'$, substantially as described and shown, and for the purpose set forth.

4. In a corn-planter, the combination of the seat O, the lever $o^2$, having notches $p$ therein, the lever P, the tongue provided with slot $o'$, and the treadle Q, pivoted to the main axle and provided with the roller $q$, for raising the seat together with the front part of the machine, substantially as described and shown.

5. The combination of the shaft F, having wheels $f$ and $h$, the boxes $g$, suitably supported, whereby they may be adjusted vertically, the shaft I, having a gear, $i$, meshed with gear H, a vertically-adjustable box, $j$, supporting said shaft I, and connections between such shaft and the seed-dropping devices, substantially as set forth.

6. In a corn-planter, the combination of the seat-bar pivotally supported and provided with notches $p$, a stop pawl or lever, P, arranged to engage said notches, and a treadle or lever, Q, having an extended arm engaged with and adapted to adjust the seat-bar, substantially as set forth.

JOHN A. CHERRY.

Witnesses:
JAMES A. CHERRY,
WILLIAM V. CARPENTER.